G. DELIUS & C. P. TATRO.
PROCESS FOR PROTECTING SHIPS FROM BARNACLES.
APPLICATION FILED MAY 22, 1911.
1,021,734.
Patented Mar. 26, 1912.
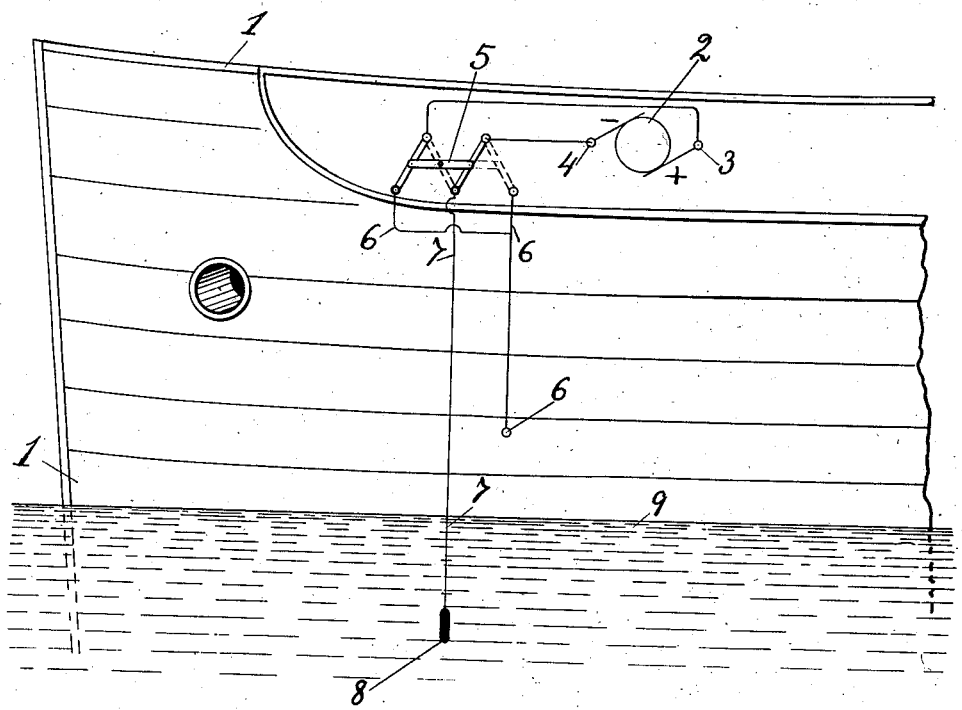
Witnesses
N. S. Waller
D. E. Waller
Inventors
George Delius.
Charles P. Tatro.
By W. R. Stevens
Attorney

UNITED STATES PATENT OFFICE.

GEORGE DELIUS AND CHARLES P. TATRO, OF SEATTLE, WASHINGTON.

PROCESS FOR PROTECTING SHIPS FROM BARNACLES.

1,021,734. Specification of Letters Patent. Patented Mar. 26, 1912.

Application filed May 22, 1911. Serial No. 628,821.

*To all whom it may concern:*

Be it known that we, GEORGE DELIUS and CHARLES P. TATRO, citizens of the United States, residing at Seattle, in the county of King and State of Washington, have invented certain new and useful Improvements in Processes for Protecting Ships from Barnacles, of which the following is a specification.

This invention relates to seagoing vessels the hulls of which are either made of metal or sheathed with metal, and its object is to protect such vessels, which we will call ships, from the accumulation of barnacles, which we do by providing means for electrochemically destroying the barnacles that may be attached to the ship, as often as may be desired, either in port or on the open sea.

To this end our invention consists in the process of protecting ships from barnacles, hereinafter more fully described, and particularly stated in the claims, reference being had to the accompanying drawing, which represents the prow of a ship showing one form of the application of our invention.

Let numeral 1 represent a portion of a ship's hull having a metallic surface; 2 a generator or other source of a direct current of electricity, and 3 and 4 its two poles. These two poles are connected respectively with the two arms of a switch 5. A terminal wire 6, is connected with the metallic surface of the ship. A terminal wire 7, is provided with a terminal 8, of electrochemically insoluble material, such, for example, as carbon, located in contact with the open water adjacent to the ship's surface but not in contact therewith. The switch 5, may be set to connect either of the wires 6 or 7 with either of the poles 3 or 4, whereby a positive current may be sent through the ship's surface 1, and through the open water 9, to the terminal 8, and be returned by wire 7, to the negative side of the generator 2, or the current may be sent through terminal 8, and open water 9, to the ship's surface, and be returned by wire 6, and the switch as shown in dotted lines, to the negative side of the generator.

Ocean water is a brine composed of various salts in solution. The barnacle is a small shell fish having long tentacles which exude glutenous matter whereby they adhere to almost anything solid under water, in which they live and which they inhale to obtain nutriment. Barnacles, gathering on the bottoms of seagoing vessels, impede sailing and are a universal maritime pest, frequently so overloading a ship as to render it unseaworthy. The passing of a direct electric current at intervals, as above described, to and fro through the metallic surface of a ship and the brine in contact with it sets up electrochemical action which converts the saline constituents of the brine into gaseous and saline elements which quickly kill the barnacles and dissolve their gluten, leaving them to drop off from the ship. This to and fro application of electric currents also stops the corrosive action of brine upon metals; cleans them from scale and leaves the ship's bottom smooth and bright. We have not found it practicable or necessary to use a current of sufficient voltage to kill the barnacles by direct electric action. On the contrary, by locating the electric terminals as described, a moderate current of electricity will induce sufficient chemical action in the brine to accomplish the results stated. For this reason, every metal bottomed seagoing vessel may carry the necessary equipment to clean itself from barnacles, and as the cleaning may be done either in port or when sailing slowly in mid ocean the cost of cleaning vessels by this process is extremely light in comparison with the cost by the old process of docking and scraping. It is further a source of economy because the cleaning can be done while the ship is loading or unloading; and yet further, because a clean smooth bottom insures the best sailing ability of the ship.

We claim—

1. The process of protecting ships from barnacles, comprising the connecting of the metallic surface of the ship with one pole of a source of direct current electricity; the locating under water near to the said surface but not in contact therewith of an electrolytically insoluble terminal and connecting it with the other pole of said source of electricity; interposing in the two lines of electric connections a reversing switch; sending an electric current through the circuit of the said connections, and repeatedly shifting the switch, whereby the two terminals are alternately converted into positive and negative poles for electrochemical action.

2. The process of protecting ships from barnacles, comprising connecting the terminal of one pole of a source of direct current electricity with the metallic surface of the ship; the locating of the terminal of the other pole in the water near the ship; sending a direct electric current through the said pole terminals and the ship's metallic surface, the circuit being completed through the water around the ship, and reversing at intervals the direction of the electric current.

3. The process of protecting ships from barnacles, comprising the repeated steps of sending a direct electric current into the metallic surface of the ship to return through an electric terminal immersed in the open water, and then sending a direct current into the immersed terminal to return through the metallic surface of the ship; the circuit being completed in each case through the open water between the ship and the immersed terminal.

4. The process of protecting ships from barnacles, which comprises the steps of sending a direct electric current to and fro at intervals through the metallic surface of the ship and the adjacent water.

In testimony whereof we affix our signatures in presence of two witnesses.

GEORGE DELIUS.
CHARLES P. TATRO.

Witnesses:
J. G. ALLAN,
D. C. SKUTT.